United States Patent
Peng et al.

(10) Patent No.: US 8,084,748 B2
(45) Date of Patent: Dec. 27, 2011

(54) RADIOACTIVE MATERIAL DETECTING AND IDENTIFYING DEVICE AND METHOD

(75) Inventors: Hua Peng, Beijing (CN); Kun Zhao, Beijing (CN); Yu He, Beijing (CN); Ming Ruan, Beijing (CN)

(73) Assignee: Nuctech Company Limited, Beijing (CN)

(*) Notice: Subject to any disclaimer, the term of this patent is extended or adjusted under 35 U.S.C. 154(b) by 378 days.

(21) Appl. No.: 12/421,194

(22) Filed: Apr. 9, 2009

(65) Prior Publication Data
US 2010/0072385 A1 Mar. 25, 2010

(30) Foreign Application Priority Data
Apr. 28, 2008 (CN) .......................... 2008 1 0105351

(51) Int. Cl.
*G01J 1/42* (2006.01)
(52) U.S. Cl. ........................................... 250/394
(58) Field of Classification Search .................. 250/366, 250/367, 390.01–390.12, 391–395
See application file for complete search history.

(56) References Cited

U.S. PATENT DOCUMENTS
5,331,961 A * 7/1994 Inaba et al. ................... 600/436
2010/0090115 A1* 4/2010 Lerch et al. ................... 250/366

OTHER PUBLICATIONS

"Simplified Slow Anti-Coincidence Circuit for Compton Suppression Systems", by D. Al-Azmi, *Applied Radiation and Isotopes*, 66 (2008), pp. 1108-1116.

"Scintillation Parameters of a Phoswich β- and γ-Ray Detector", by A.Ananenko et al., *Instruments and Experimetnal Techniques*, vol. 45, No. 2, (2002), pp. 178-182.

"A New High Energy Gamma Radiation Measuring System", by T. Kishimoto et al., *Nuclear Instrumetns and Methods*, 198 (1982), pp. 269-276.

"A Total Absorption Gamma Ray Spectrometer Combining Sodium Oidide and Plastic Scintillators", by W. Ellett et al., *Nuclear Instruments and Methods*, 7 (1960), pp. 56-62.

"One-Crystal NaI Spectrometer" by M. Suffert et al., *Nuclear Instruments and Methods*, 63 (1968), pp. 1-12.

"Further Search for the Decay . . . ", by S. Frankel et al., *Physical Review*, vol. 118, No. 2, (1960) pp. 589-590.

The Search Report from the European Patent Office in connection with correspondence EP patent application Serial No. EP09156160. 5, dated Apr. 30, 2009.

Chinese Office Action for CN 200810105351.3, dated Aug. 8, 2011, including English Summary of the Office Action.

* cited by examiner

*Primary Examiner* — Kiho Kim
(74) *Attorney, Agent, or Firm* — Westman, Champlin & Kelly, P.A.

(57) ABSTRACT

In a device for detecting and identifying a radioactive material, a coincidence device is configured to receive the first pulse signals and the second pulse signals from a first second detectors; a multi-channel analyzer is configured to receive the second pulse signals, count said second pulses and generate the energy spectrum of the gamma rays according to the counted second pulses, when the first pulse signals and the second pulse signals are both valid; a linear gate is configured to receive coincidence signals and being turned on, when the output signals of the coincidence device are valid, to allow the multi-channel analyzer to count the second pulses; and a determination device is configured to determine the type of the radioactive material emitting the gamma rays according to the generated energy spectrum and determine whether a radiation exists or not.

9 Claims, 2 Drawing Sheets

RADIOACTIVE MATERIAL DETECTING AND IDENTIFYING DEVICE AND METHOD

The present application claims priority of Chinese patent application Serial No. 2008 10105351.3, filed Apr. 28, 2008, the content of which is hereby incorporated by reference in its entirety

FIELD OF THE INVENTION

The present invention relates to a device and a method for detecting and identifying radioactive material and, in particular, to a device and a method for detecting and identifying radioactive material which not only can detect presence of the radiation material, but also can determine the type of the detected radioactive material, so that highly efficient supervision for the radioactive material can be implemented, and amount of labor can be reduced.

The device and method for detecting and identifying the radioactive material of this invention can be applied to any site where the radioactive material is required to be monitored and controlled, such as a customs port, a nuclear physics lab, a nuclear power plant, a burial site or a warehouse for nuclear waste, a hospital, a weapon factory, and so on.

DESCRIPTION OF THE RELATED ART

Conventional radiation monitoring systems usually employ a single type of detector as detecting means to separately detect the presence of a radioactive material, the position of the radioactive material, or the type of the radioactive material. For example, a plastic scintillator detector can detect and count radiation emitted from a radioactive material so as to detect whether there is the radioactive material or not and to detect strength of the emitted rays. Since the plastic scintillator detector has advantages of, for example, high efficiency and broader energy response, it becomes the first choice in the fields of detecting special nuclear material and radioactive material, measuring environmental dose-rate and energy spectrums, and so on. However, the identification can not be very accurate by using the plastic scintillator detector.

A NaI (natriumiodide) detector is a scintillator detector having a higher energy resolution, and plays an important role in almost all of nuclear detection fields. Such NaI detector can obtain an energy spectrum of rays while counting the radiation, and then compares the obtained energy spectrum with the standard spectrum of radioactive nuclides to determine the type of the radioactive material emitting the radiation. However, since the energy response range in a radioactive material monitoring system is between 0.05 and 3 MeV, Compton scattering occurs during the interaction of the rays and the NaI crystal. In the Compton scattering, since photons may escape from the NaI crystal, causing only part of photon energy to be deposited in the NaI crystal, contribution of the photons to a full-energy peak will be reduced, and a Compton plateau in the energy spectrum is formed, resulting in disturbance to the background of the energy spectrum. When the NaI detector is used to detect the radioactive material, since the activity of the detected radioactive material is usually very low, high sensitivity is required. However, using NaI detector alone can not meet this requirement.

SUMMARY OF THE INVENTION

In order to overcome the above-mentioned defect existing in the conventional technique, the present invention provides a device and a method for detecting and identifying a radioactive material which combines a plastic scintillator detector with a NaI detector to enhance energy resolution.

The present invention provides a device and a method for detecting and identifying a radioactive material to detect the rays emitted from the radioactive material with a higher efficiency.

According to another aspect of the present invention, a device and a method for detecting and identifying a radioactive material are provided to employ an anti-coincidence technique to form an "anti-Compton spectrometer system" with an improved functionality.

According to an aspect of the present invention, a device for detecting and identifying a radioactive material is provided. The device for detecting and identifying a radioactive material comprises: a first detector including a detection surface and generating first pulse signals when gamma rays are incident onto said detection surface; a second detector generating second pulse signals and provided in the front of the detection surface of the first detector, so that the gamma rays entering the second detector directly enter the first detector after passing through the second detector; and an identification unit. The identification unit comprises: a coincidence device configured to receive the first pulse signals and the second pulse signals from said first detector and said second detector; a multi-channel analyzer configured to receive the second pulse signals from the said second detector, the multi-channel analyzer generating the energy spectrum according to the second pulses, when one of said first pulse signals and said second pulse signals is valid; and a determination device configured to determine the type of the radioactive material according the generated energy spectrum and to determines whether a gamma radiation exists or not according to said first pulse signals or said second pulse signals.

In the device for detecting and identifying a radioactive material, the identification unit further comprises a linear gate configured to receive coincidence signals output from said coincidence device, the linear gate being turned on, when the output signals of said coincidence device are valid, to allow said multi-channel analyzer to count said second pulses.

In the device for detecting and identifying a radioactive material, the identification unit further comprises a first single-channel analyzer through which the first pulse signals from said first detector are inputted to said coincidence device and said determination device.

In the device for detecting and identifying a radioactive material, the identification unit further comprises a second single-channel analyzer through which the second pulse signals from said second detector are inputted to said coincidence device and said determination device.

In the device for detecting and identifying a radioactive material, the identification unit further comprises a delay timer through which the second pulse signals from said second detector are inputted to said multi-channel analyzer.

In the device for detecting and identifying a radioactive material, said first detector is a plastic scintillator detector.

In the device for detecting and identifying a radioactive material, said second detector is a NaI detector.

According to another aspect of the present invention, a method for detecting and identifying a radioactive material is provided. The method comprises: using a first detector to generate first pulse signals; using a second detector provided in the front of a detection surface of the first detector to generate second pulse signals; inputting the first pulse signals and the second pulse signals from said first detector and said second detector into a coincidence device to perform coincidence; when one of said first pulse signals and said second pulse signals is valid, using a multi-channel analyzer to count said second pulses and to generate the energy spectrum according to the counted second pulses; and determining the type of the radioactive material emitting the gamma rays according to the generated energy spectrum of the gamma rays and determining whether a radiation exists or not according to said first pulse signals or said second pulse signals.

BRIEF DESCRIPTION OF THE DRAWINGS

The above and other features of the present invention will become obvious and can be more readily understood through the following description to embodiments in conjunction with the drawings, in which.

DETAILED DESCRIPTION OF THE PREFERRED EMBODIMENT

Reference is made to the illustrative and non-limited embodiment of the present invention in details to explain the device for detecting and identifying a radioactive material according to the present invention.

Figures 1, 2:
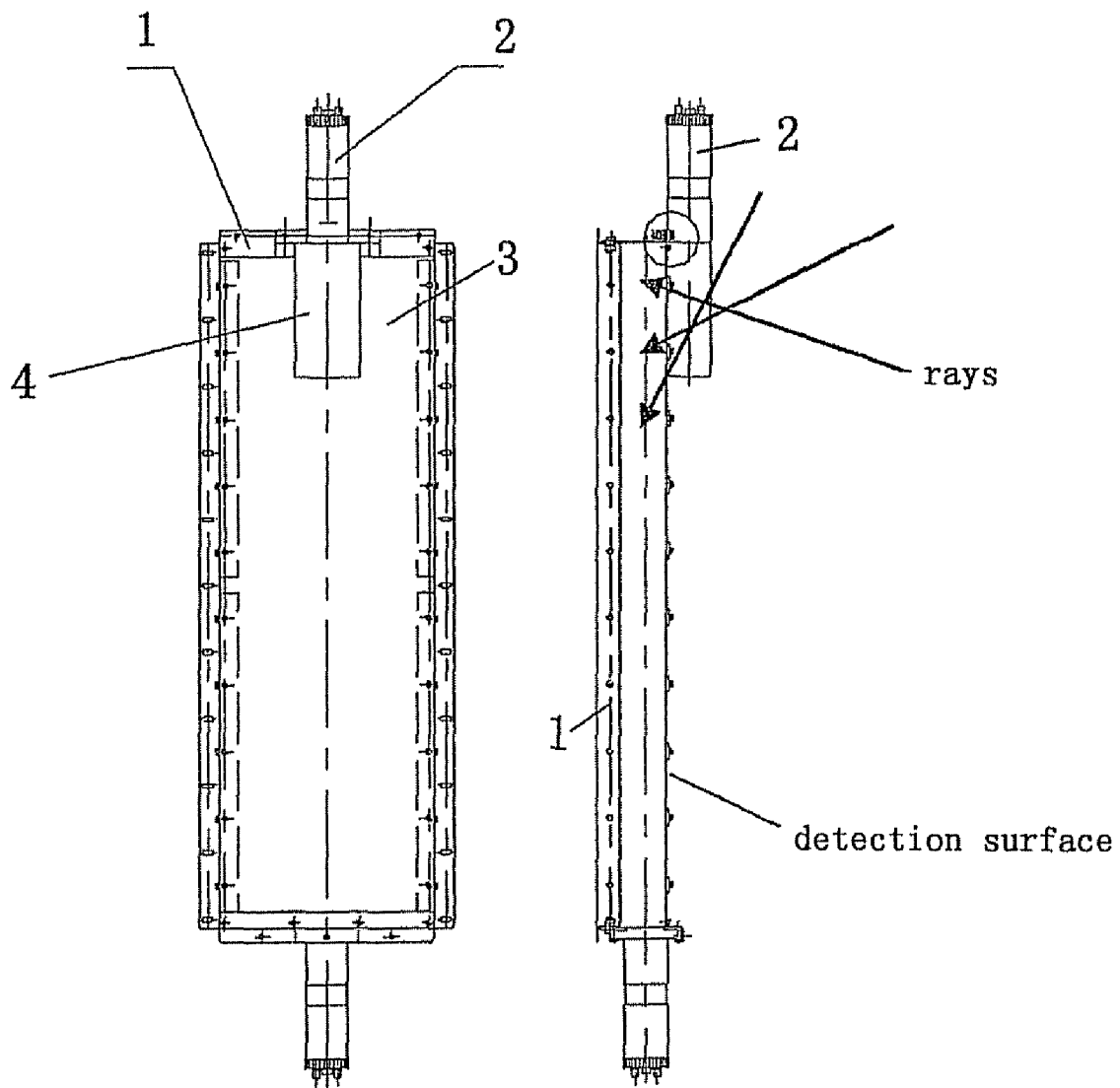
FIG. 1 is a schematic view of a structure of the device for detecting and identifying the radioactive material according to the present invention.
FIG. 2 is a side view of FIG. 1.
Figure 3:
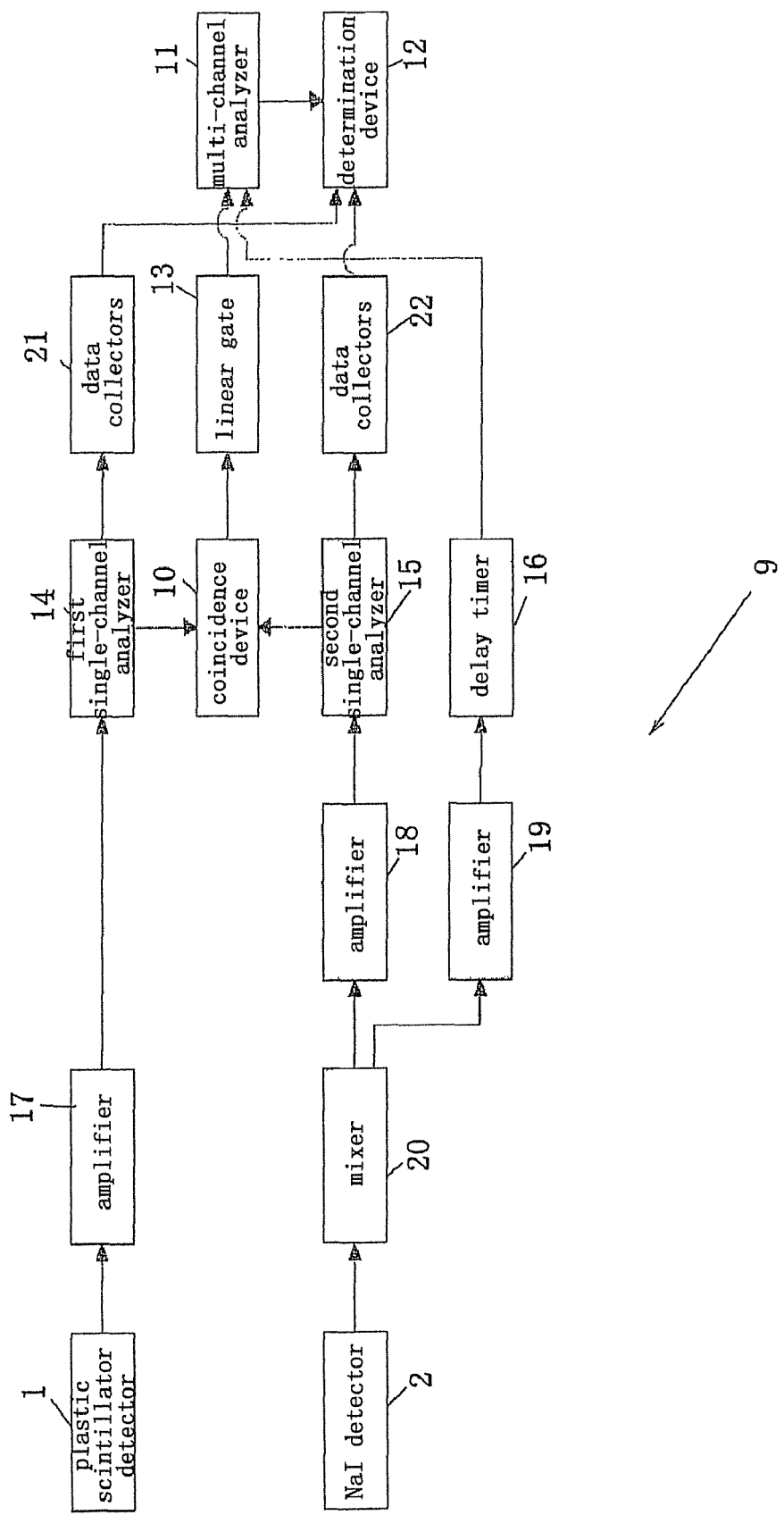
FIG. 3 is a circuit block diagram of the device for detecting and identifying the radioactive material according to the present invention.

Referring to FIGS. 1 and 2, the device for detecting and identifying a radioactive material according to the present invention comprises a first detector and a second detector. The first detector comprises a detection surface and generates a first pulse signal when rays, for example, gamma rays, X rays, or neutron rays, are incident onto said detection surface. The second detector generates a second pulse signal and is provided in front of the detection surface of the first detector, so that the gamma rays entering the second detector can directly enter the first detector after passing through the second detector. In an exemplary embodiment, the first detector may be, for example, a plastic scintillator detector for detecting X-ray and γ-ray. Such plastic scintillator detector 1 can statistically count the detected rays. The second detector may be, for example, a NaI (Natriumiodide) detector 2.

In the exemplary embodiment shown in FIG. 1, both of the plastic scintillator detector 1 and the NaI detector 2 are in a rectangular parallelepiped shape. The plastic scintillator detector 1 and the NaI detector 2 are arranged side by side and are connected together via, for example, a bolt structure. In particular, the NaI detector 2 is arranged to closely abut on the front of the detection surface 3 of the plastic scintillator detector 1, and the detection surface 4 of the NaI detector 2 is parallel to that of the plastic scintillator detector. In this way, almost all of the gamma rays that enter the NaI detector 2 can directly enter the plastic scintillator detector 1 after passing through the NaI detector 2, so that it is ensured to obtain a better energy spectrum of the incident gamma rays. It can be understood that the detection surface of the plastic scintillator detector 1 can not be entirely covered by the NaI detector 2, because the volume of the NaI detector 2 is usually smaller than that of the plastic scintillator detector 1. Thus, part of the gamma rays will directly enter the plastic scintillator detector 1 instead of passing through the NaI detector 2.

The device for detecting and identifying a radioactive material comprises an identification unit 9. The identification unit 9 is configured to process the pulse signals generated by the plastic scintillator detector 1 and the NaI detector 2 to determine whether a radiation exists or not and to determine the type of the radioactive material emitting the gamma rays according to the resultant energy spectrum. Specifically, the identification unit 9 comprises a coincidence device 10, a multi-channel analyzer 11, and a determination device 12. The coincidence device 10 receives the first pulse signals and the second pulse signals from the first detector such as the plastic scintillator detector 1 and the second detector such as the NaI detector 2, respectively. The multi-channel analyzer 11 receives the second pulse signals from the NaI detector 2 and counts the second pulses when one of the first pulse signals and the second pulse signals is valid. Then, the multi-channel analyzer 11 generates the energy spectrum of the gamma rays according to the counted second pulses. The determination device 12 may be, for example, a computer programmed with a predetermined program, which determines whether there is a radioactive material according to the first pulse signals or the second pulse signals and determines the type of the radioactive material emitting the gamma rays according to the resultant energy spectrum. Specifically, when at least one of the first pulse signals and the second pulse signals periodically is valid, the determination device determines that there are gamma rays entering at least one of the plastic scintillator detector 1 and the NaI detector 2 so as to determine the presence of the radioactive material. Meanwhile, by comparing the obtained energy spectrum with the standard energy spectrums of various radioactive nuclides previously stored in the computer, the type of the radioactive material can be determined.

In an exemplary embodiment, the identification unit 9 further comprises a linear gate 13. The linear gate 13 receives coincidence signals from the coincidence device 10. When one of the first and second pulse signals input into the coincidence device 10 is valid, the coincidence device 10 outputs valid signals. When both of the first and second pulse signals are valid, e.g., both positive or negative, the coincidence device 10 outputs invalid signals. When the signals from the coincidence device 10 are valid, the linear gate 13 is turned on to allow the multi-channel analyzer 11 to count the second pulses.

In an exemplary embodiment, the identification unit 9 further comprises a first single-channel analyzer 14 by which the first pulse signals from the plastic scintillator detector 1 are processed to generate first differential signals to be input to one input terminal of the coincidence device 10 and the determination device 12, respectively, and a second single-channel analyzer 15 by which the second pulse signals from the NaI detector 2 are processed to generate second differential signals to be input to the other input terminal of the coincidence device 10 and the determination device 12, respectively. The identification unit 9 further comprises a delay timer 16 by which the second pulse signals from the NaI detector 12 are delayed by a predetermined duration and then are input to the multi-channel analyzer 11.

In a further exemplary embodiment, the identification unit 9 further comprises amplifiers 17-19 for amplifying the pulse signals, and data collectors 21 and 22 for sampling the differential signals from the single-channel analyzers 14 and 15. Further, a mixer 20 is provided to divide the second pulse signals from the NaI detector 2 into two separate signals, one of which is input to the determination device 12, and the other of which is input to the multi-channel analyzer 11.

In the device for detecting and identifying a radioactive material according to the present invention, the NaI detector is combined with the plastic scintillator detector, and the coincidence device is employed to enable the plastic scintillator detector to function as an anti-coincidence device, so that an anti-Compton energy spectrometer is constructed. In this way, not only the two detectors can provide respective advantages, but also the contribution of the gamma rays passing through the NaI detector 2 to form the Compton plateau can be suppressed, so that energy resolution in the low energy range is enhanced.

Next, operation of the device for detecting and identifying the radioactive material according to the present invention is described by referring to FIGS. 1 and 2.

When the device for detecting and identifying a radioactive material according to the present invention is used to detect and identify the radioactive material, scattered photons escaping from the NaI detector 2 are incident into the plastic scintillator detector 1 which acts as an anti-coincidence detector. The first pulse signals output from the plastic scintillator detector 1 pass through the amplifier 17 and the first single-channel analyzer 14 to form the first differential signals. The first differential signals are inputted to one input terminal of the coincidence device 10. The first differential signals are also inputted to the data collector 21 to be counted therein. Meanwhile, the second pulse signals, each having a small amplitude and output from the NaI detector 2, pass through the mixer 20 to be divided into two separate signals. One passes through the amplifier 18 and the second single-channel analyzer 15 to form the second differential signals. Then, the second differential signals are inputted to the other input terminal of the coincidence device 10. Further, the second differential signals also are inputted to the data collector 22 to be counted therein. The other signal of the second pulse signals passes through the amplifier 19 to be amplified and then passes through the delay timer 16 to be delayed by a predetermined duration, and then is inputted to the multi-channel analyzer 11.

The coincidence device 10 controls the linear gate 13 to be turned on/off according to the states of the first and second differential signals from the single-channel analyzers 14 and 15, respectively. Specifically, when both of the first and second differential signals are valid (i.e., both positive or negative), the coincidence device 10 generates no signal, i.e., generates an invalid signal. When any one of the first differential signals and the second differential signals is valid, the coincidence device 10 outputs a valid signal. When the coincidence device 10 outputs a valid signal, the linear gate is turned on; otherwise the linear gate is turned off. When the linear gate 13 is turned on, the second pulse signals output from the NaI detector 2 and corresponding to the energy of gamma rays, i.e., the pulse signals from the delay timer 16, are allowed to be recorded in the energy spectrum by the multi-channel analyzer. When the linear gate 13 is turned off, the second pulse signals from the NaI detector 2 are not allowed to be recorded by the multi-channel analyzer. In this case, the energy spectrum of the gamma rays does not contain the second pulse signals from the NaI detector 2. Therefore, when the plastic scintillator detector 1 and the NaI detector 2 both output pulse signals, the single-channel analyzer 11 does not record the second pulse signals generated by the NaI detector 2, and thus the pulse signals caused by the Compton scattering are shielded, thereby realizing anti-coincidence measurement.

According to another aspect of the present invention, a method for detecting and identifying a radioactive material is provided. The method comprises using a first detector for detecting X-rays and γ-rays, such as a plastic scintillator detector 1, to generate a first pulse signals, using a second detector provided in front of the detection surface 3 of the plastic scintillator detector 1, such as a NaI detector 2, to generate a second pulse signals, inputting the first pulse signals and the second pulse signals from the first detector and the second detector into a coincidence device to perform coincidence, using a multi-channel analyzer to count the second pulses and to generate energy spectrum according to the counted second pulses when the first and second pulse signals are valid, and determining the type of a radioactive material according to the generated energy spectrum and determining presence of radiation according to the first pulse signals or the second pulse signals, for example, when at least one of the first pulse signals and the second pulse signals is valid, otherwise no radiation is present.

Although exemplary embodiments of the present invention have been described, it will be appreciated by those skilled in the art that changes may be made in forms and details without departing from the spirit and scope of the present invention, the scope of which is defined in the appended claims and their equivalents.

What is claimed is:

1. A device for detecting and identifying a radioactive material, comprising:
   a first detector including a detection surface and configured to generate first pulse signals when gamma rays are incident onto said detection surface;
   a second detector configured to generate second pulse signals and provided in the front of the detection surface of the first detector, so that the gamma rays entering the second detector directly enter the first detector after passing through the second detector; and
   an identification unit comprising:
      a coincidence device configured to receive the first pulse signals and the second pulse signals from said first detector and said second detector;
      a multi-channel analyzer configured to receive the second pulse signals from the said second detector, the multi-channel analyzer generating the energy spectrum of gamma rays according to the second pulses, when one of said first pulse signals and said second pulse signals is valid;
      a linear gate configured to receive coincidence signals from said coincidence device, the linear gate being turned on, when the output signals of said coincidence device are valid, to allow said multi-channel analyzer to count said second pulses; and
      a determination device configured to determine the type of the radioactive material emitting the gamma rays according the generated energy spectrum of the gamma rays.

2. The device for detecting and identifying a radioactive material according to claim 1, wherein said determination device determines whether a radiation exists or not according to said first pulse signals or said second pulse signals.

3. The device for detecting and identifying a radioactive material according to claim 2, wherein the identification unit further comprises a first single-channel analyzer through which the first pulse signals from said first detector are inputted to said coincidence device and said determination device.

4. The device for detecting and identifying a radioactive material according to claim 3, wherein the identification unit further comprises a second single-channel analyzer through which the second pulse signals from said second detector are inputted to said coincidence device and said determination device.

5. The device for detecting and identifying a radioactive material according to claim 2, wherein the identification unit further comprises a delay timer through which the second pulse signals from said second detector are inputted to said multi-channel analyzer.

6. The device for detecting and identifying a radioactive material according to claim 1, wherein said first detector is a plastic scintillator detector.

7. The device for detecting and identifying a radioactive material according to claim 1, wherein said second detector is a NaI detector.

8. A method for detecting and identifying a radioactive material, comprising:

using a first detector to generate first pulse signals;

using a second detector provided in the front of a detection surface of the first detector to generate second pulse signals;

inputting the first pulse signals and the second pulse signals from said first detector and said second detector into a coincidence device to perform coincidence;

when one of said first pulse signals and said second pulse signals both is valid, using a multi-channel analyzer to count said second pulses and to generate the energy spectrum of the gamma rays according to the counted second pulses; and determining the type of the radioactive material emitting the gamma rays according to the generated energy spectrum, wherein a linear gate is provided to receive coincidence signals from said coincidence device and being turned on, when the output signals of said coincidence device are valid, to allow said multi-channel analyzer to count said second pulses.

9. The method for detecting and identifying a radioactive material, further comprising:

determining whether a radiation exists or not according to said first pulse signals or said second pulse signals.

* * * * *